July 15, 1969  M. L. GREENBERG ETAL  3,455,155
WIND TUNNEL MODEL SUPPORT

Filed Dec. 29, 1966

INVENTORS
MYRON L. GREENBERG
& DANIEL J. KOLESAR
BY
Barnes, Kisselle, Raisch & Choate
ATTORNEYS July 15, 1969  M. L. GREENBERG ET AL  3,455,155
WIND TUNNEL MODEL SUPPORT
Filed Dec. 29, 1966  5 Sheets-Sheet 2
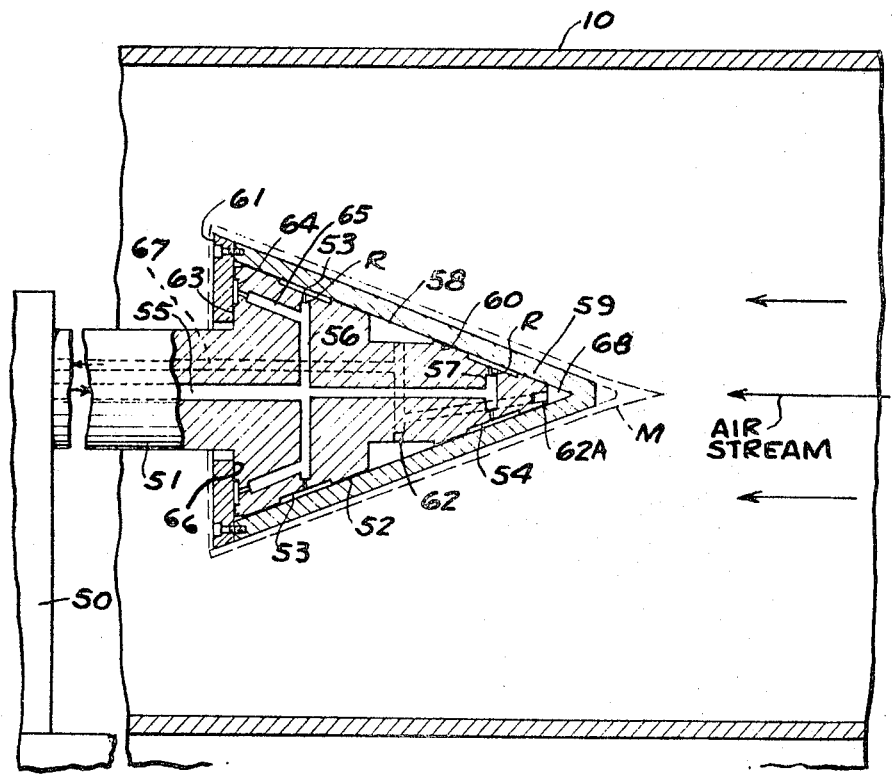
FIG. 3
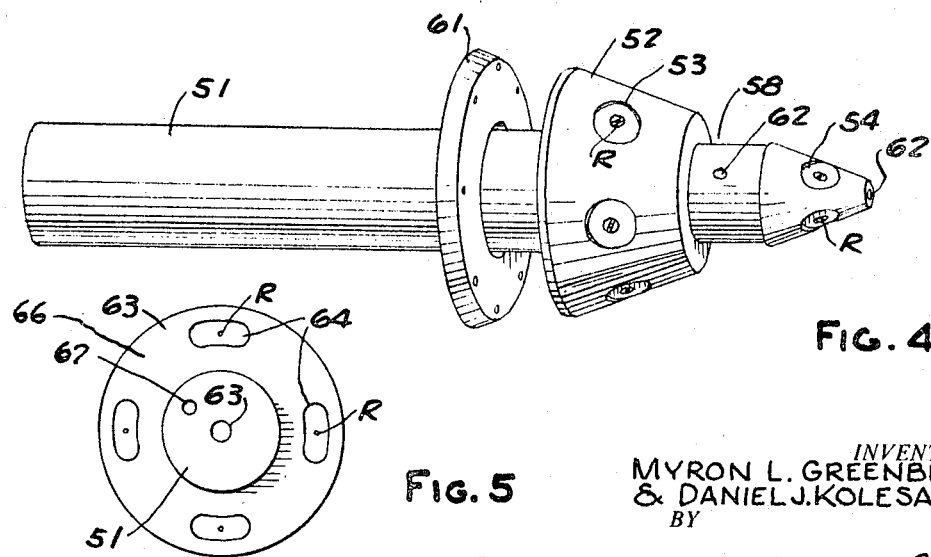
FIG. 4
FIG. 5
INVENTORS
MYRON L. GREENBERG
& DANIEL J. KOLESAR
BY
Barnes, Kisselle, Raisch & Choate
ATTORNEYS

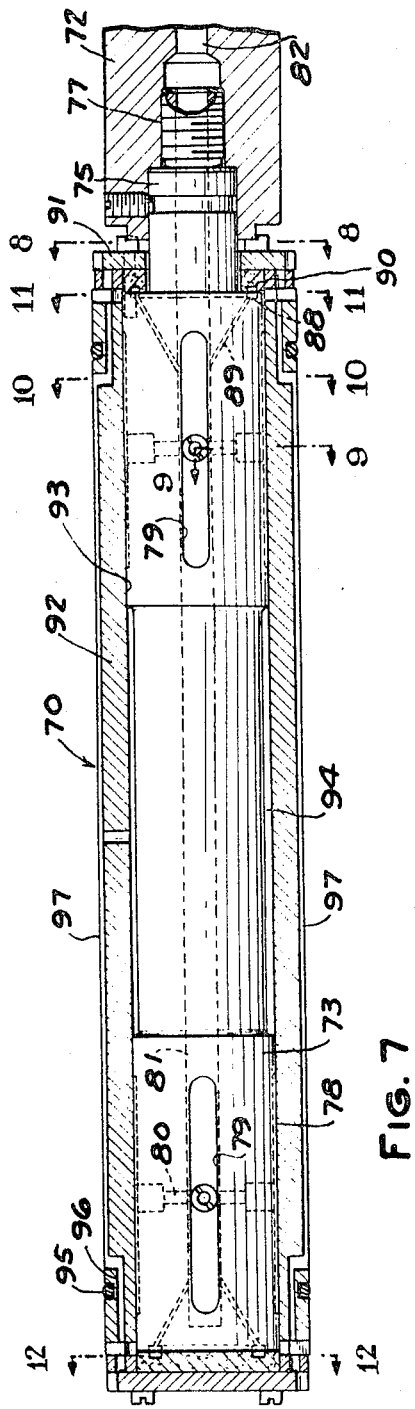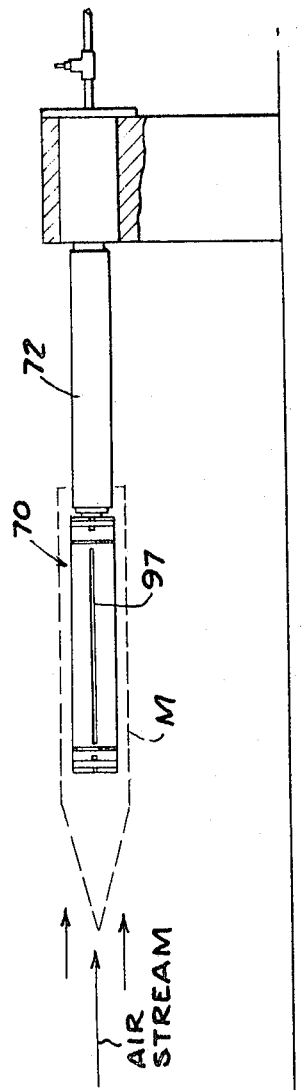

INVENTORS
MYRON L. GREENBERG
& DANIEL J. KOLESAR
BY
*Barnes, Kisselle, Raisch & Choate*
ATTORNEYS United States Patent Office 3,455,155
Patented July 15, 1969

3,455,155
WIND TUNNEL MODEL SUPPORT
Myron L. Greenberg, Union Lake, and Daniel J. Kolesar,
Warren, Mich., assignors to The Babcock & Wilcox
Company, New York, N.Y., a corporation of New
Jersey
Filed Dec. 29, 1966, Ser. No. 605,780
Int. Cl. G01m 9/00
U.S. Cl. 73—147                                    19 Claims

ABSTRACT OF THE DISCLOSURE

A wind tunnel model support is provided which allows the model to move to equilibrium depending on the various actions of the air flow. To accomplish this result, the model is supported on a rotor. The rotor is then maintained on the model support by means of air bearings. Various embodiments are provided which allow motion in desired directions and which rigidly restricts motion in all other directions.

---

This invention relates to a support for models in a wind tunnel.

In the study of models in a wind tunnel, it is desirable that the model be supported with minimum friction so that it will assume an attitude of equilibrium in the wind tunnel under the action of the air flowing over the model. Wind tunnel testing is done by placing a scale model of the aerodynamic shape under test in a stream of moving air called a wind tunnel. It is very important, if reliable and unambiguous test results are to be obtained, that the model be supported so as to impose a minimum of both static and running friction on the supports in the directions in which no constraints are to be applied.

This latter point should be clarified so that the purpose and description of the invention can be stated simply. When a model (or indeed any object) is supported in space, it is possible to have a total of six degrees of freedom, three linear (translational) and three rotational. A free body has all six degrees of freedom—it can move in any direction and turn in any direction. As soon as the body is actually supported and held in place, at least one of the possible freedoms is removed, usually more than one. Specifically, since a wind tunnel has its calibrated air speed available in only a limited part of its throat area, a support for a wind tunnel model does not usually have any translational freedom. It can, however, have any or all of the rotational degrees of freedom, depending on the type model and the purpose of the test.

It is an object of this invention to provide a support system which can be used to allow essentially frictionless limited motion in one or several angular degrees of freedom while providing great rigidity in all directions and angular degrees of freedom in which motion is not permitted.

Further objects of this invention are to provide a support system which will not wear appreciably, which has extended life, and which can be built and assembled without undue difficulty.

Another object of this invention is to provide a support system which will impose a minimum total running friction even at quite high speeds in one degree of freedom, usually roll, even when combined with limited pitch and/or yaw motion.

Model supports are usually held on a Z-bar, one arm of which protrudes horizontally into the tunnel so that the model can be set in the calibrated throat of the tunnel. In order that models can be suspended in the airstream so that the air flow over the model is not disturbed by the support, the Z-bar is so placed as to hold the support from the rear, if possible, in an area smaller than that subtended by the shock waves from the model.

It is a final object of this invention to provide a support which conforms to these precautions, but without the friction which is the usual problem with these supports.

In the drawings:

FIG. 3 is a fragmentary longitudinal sectional view of a wind tunnel embodying a further modified form of a wind tunnel model support.

FIG. 4 is an exploded perspective view of a portion of the wind tunnel model shown in FIG. 3.

FIG. 5 is a rear elevational view of a further modified form of wind tunnel support.

FIG. 6 is a side elevational view of a further modified form of wind tunnel support.

FIG. 7 is a fragmentary longitudinal sectional view of a portion of the wind tunnel model support in FIG. 6.

Figure 1:
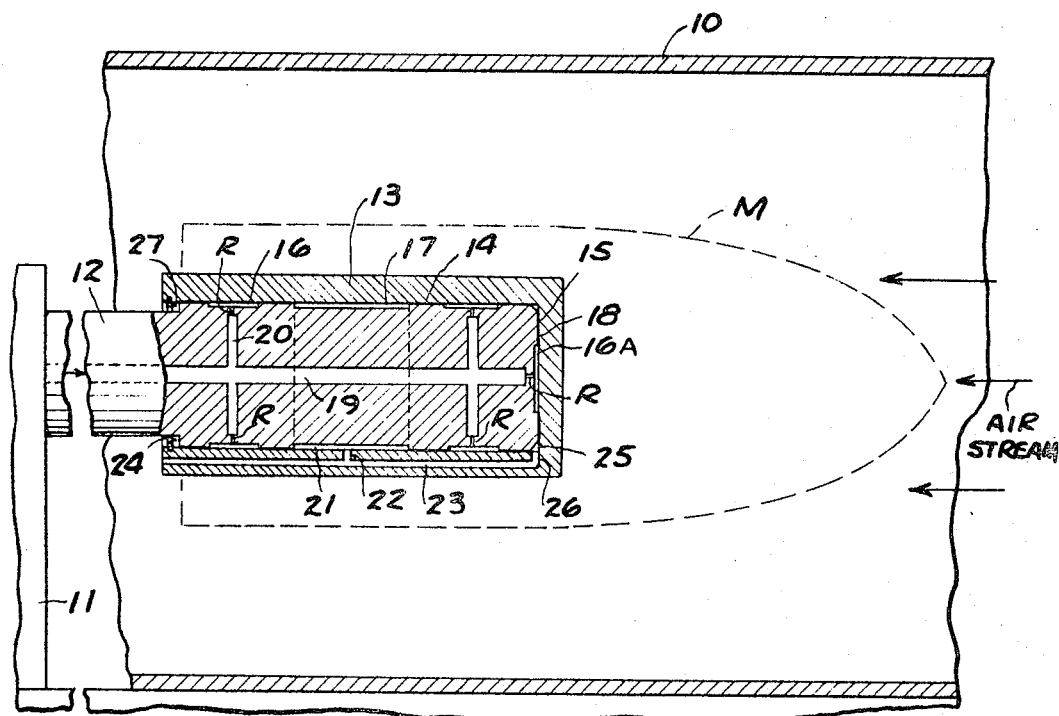
FIG. 1 is a fragmentary side elevational view of a wind tunnel and wind tunnel model support embodying the invention.

Referring to FIG. 1, the wind tunnel model support embodying the invention is adapted to be placed in a wind tunnel 10, herein shown diagrammatically, through which air under pressure is directed longitudinally, to test and evaluate a model M having a particular aerodynamic shape. This embodiment is so designed as to be stable under applied axial load or a component thereof as shown by the arrow in FIG. 1. It has freedom in roll only while axial force is applied, being so arranged as to float but without compensation on the thrust force when the airstream is not on.

A base 11 has a support 12 thereon which extends longitudinally of the tunnel 10 and rotatably supports a rotor 13 on which the model M is (for example) frictionally held. Support 12 includes a longitudinally extending cylindrical surface 14 and a transverse radial surface 15. A plurality of circumferentially spaced pressure pockets or pads 16 are provided in two longitudinally spaced rows on the cylindrical surface 14 and a pressure pad 16A is provided at the center of the radial surface 15. Rotor 13 includes a cylindrical surface 17 which is complementary to the cylindrical surface 14 and a radial surface 18 complementary to the surface 15. A gaseous fluid such as air under pressure is directed from a source (not shown) through an axial bore 19 in the support 12 to the pressure pad 16A on the radial surface 15 and through circumferentially spaced radial passages 20 to the pressure pads 16 on the cylindrical surface 14. A restrictor R is associated with each pressure pad and serves to reduce the pressure of fluid supplied to each pressure pad and also insure that proper pressure proportioning is supplied thereto.

When fluid under pressure is supplied continuously to each of the pressure pads, a thin film of fluid flows from the pressure pads 16 and 16A radially outwardly and supports the rotor 13 in stable frictionless relation to the support 12 so that rotor 13 is free to rotate about the axis of the support under the action of wind upon model M which is supported by the rotor 13. The fluid flowing from the pressure pad flows axially to an annular vent passage 21 in surface 14 and through a radial connecting passage 22 in rotor 13 to an axially extending vent 23. The fluid also flows axially outwardly from pressure pads 16 in surface 14 to a space 24 and a relief passage 25. The fluid flowing from the pad 16A on the surface 15 flows radially outwardly to the annular passage 25 which is connected with the axial vent passage 23 by connecting passage 26. A snap ring 27 or similar keeper is provided on the inner end of the rotor 13 to prevent inadvertent removal of the rotor 13 from the support 12.

Figure 2:
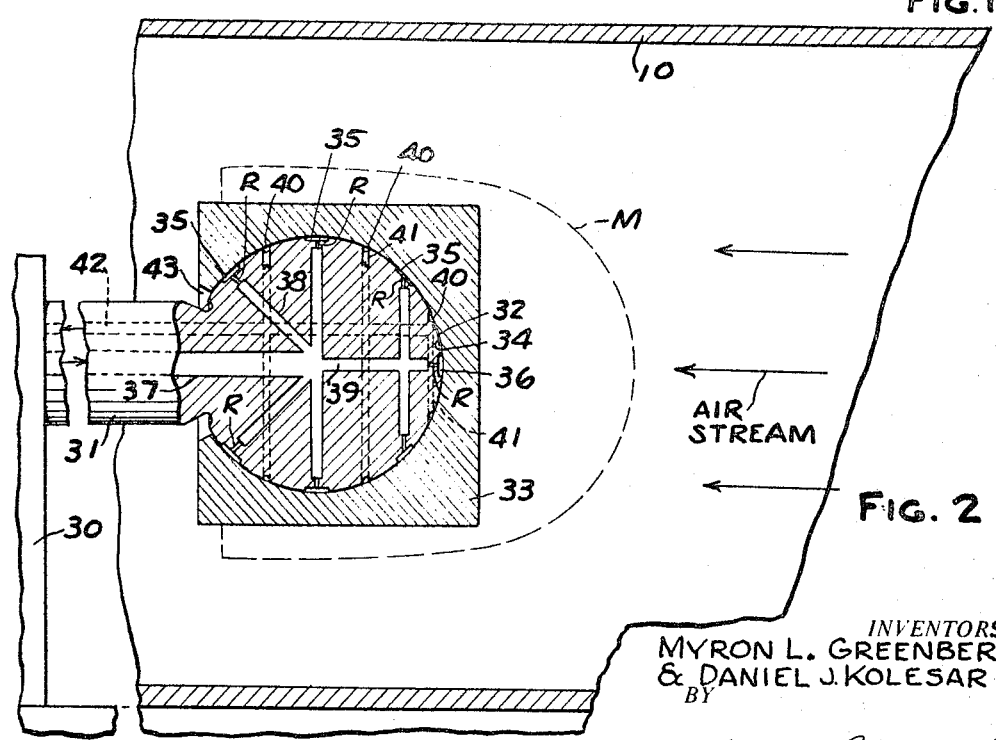
FIG. 2 is a fragmentary longitudinal sectional view of a wind tunnel embodying a modified wind tunnel model support.
Figure 9:
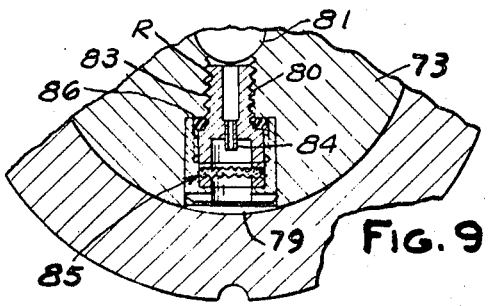
FIG. 9 is a fragmentary sectional view on an enlarged scale taken along the line 9—9 in FIG. 7.
Figure 8:
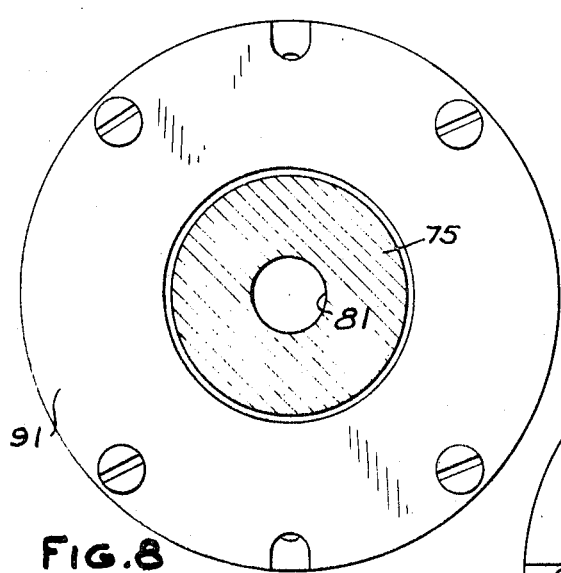
FIG. 8 is a sectional view on an enlarged scale taken along the line 8—8 in FIG. 7.

In the form of the invention shown in FIG. 2, the base 30 has a support 31 fixed thereon which has a spherical surface 32. The rotor 33 which supports the model M has a complementary spherical surface 34. The spherical surface 32 of the support 31 has circumferentially spaced pressure pads 35 in several rows about the periphery thereof and a pressure pad 36 that faces axially. Fluid such as air under pressure is provided through an axial passage 37 and interconnecting passages 38, 39 to each of the pressure pads 35, 36. Each pressure pad is provided with a restrictor R as in the previous form of the invention. Several annular vent grooves 40 are provided in surface 32 around pad 36 between the rows of pads 35 and between the front row of pads 35 and pad 36. When fluid under pressure is supplied to the pressure pads 35, 36, it flows from the pads 35, 36 radially outwardly to the vent groove 40 and then through radial vent passages 41 and an axial vent passage 42 in rotor 33 to the interior of the wind tunnel and also radially outwardly from the rear pads 35 to the area 43 that communicates with the interior of the wind tunnel.

In the form of the invention shown in FIG. 2, the model is free not only to rotate continuously about the roll axis as in the form of the invention shown in FIG. 1, but also to oscillate or rotate transversely in both pitch and yaw in accordance with the aerodynamic characteristics of the model. It will be noted that as in any supported sphere bearing, the angular freedom in pitch and yaw is limited. The pad locations are so chosen that balanced forces are available to hold the rotor centered and floated in any pitch or yaw position.

In the form of the invention shown in FIGS. 3–5, base 50 includes a conical roll-axis support bearing, an axially extending support 51 that has a frusto-conical axially extending surface 52 with two or more rows or groups of circumferentially spaced pressure pads 53, 54 to which fluid such as air is supplied through an axial passage 55 and interconnecting radial passages 56, 57. Each of the pressure pads 53, 54 is provided with a restrictor R. An annular vent groove 58 is provided between the two rows of pressure pads 53, 54. The rotor 59 has a complementary conical surface 60 and is retained axially on the support 51 either by a keeper or by a rear thrust plate 61 bolted to the rotor body 59. Plate 61 provides a surface 66 adjacent radial surface 63 of support 51. A plurality of circumferentially spaced pressure pads 64 and associated restrictors R are provided in surface 63. Fluid is supplied to the pressure pad 64 through a branch passage 65. The rotor 59 frictionally supports a model M. When fluid under pressure is supplied to each of the pressure pads 53, 54, it flows in a thin film radially outwardly between the surfaces 52, 60 and maintains the rotor 59 and, in turn, the model M in stable, frictionless relation to the support 51. The fluid flowing radially outwardly from the pads 53, 54 flows to the vent groove 58 and thence through a vent passage 62 and axial passage 67 to the atmosphere. Some of the fluid from the pads 54 flows to the space 68 formed between the apex of the rotor 59 and the apex of the support 51 and thence through a connecting passage 62A to passage 67.

In the form of the invention shown in FIGS. 6–12, the model is supported on a work model support 70 (FIG. 6) which, in turn, is supported on longitudinally extending fixed member 72. As shown in FIG. 7, the support 70 includes a fixed cylindrical base support 73 that has a reduced end 75 which is threaded and extends inwardly into an opening 77 in fixed member 72.

Support 73 includes a cylindrical surface 78 which is provided with two rows or groups of longitudinally spaced pressure pads 79, each of which communicates through a radial passage 80 and supporting (for example) a capillary tube 84. In addition, a filter unit 85 is provided between the restrictor and the pad 79. The filter unit preferably comprises a layer of microporous or sintered filter material interposed between two screens. An O-ring 86 is provided between the fitting 83 and the passage 80 to insure that flow of fluid will be entirely through the restrictor 84. As shown in FIG. 7, each pressure pad 79 is elongated in a direction longitudinally of the wind tunnel model support.

Figure 11:
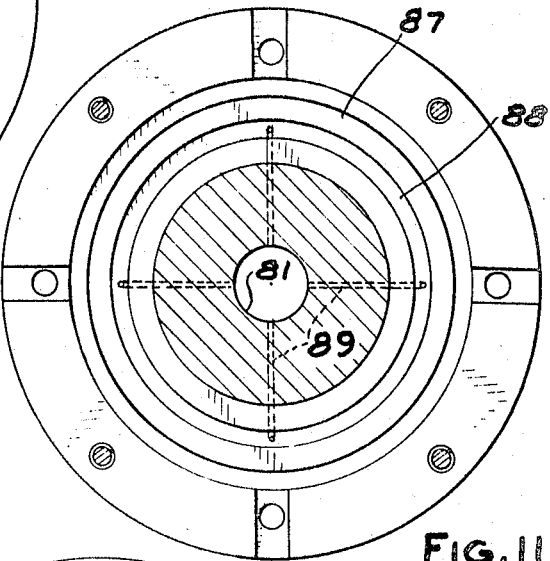
FIG. 11 is a sectional view taken along the line 11—11 in FIG. 7.
Figure 10:
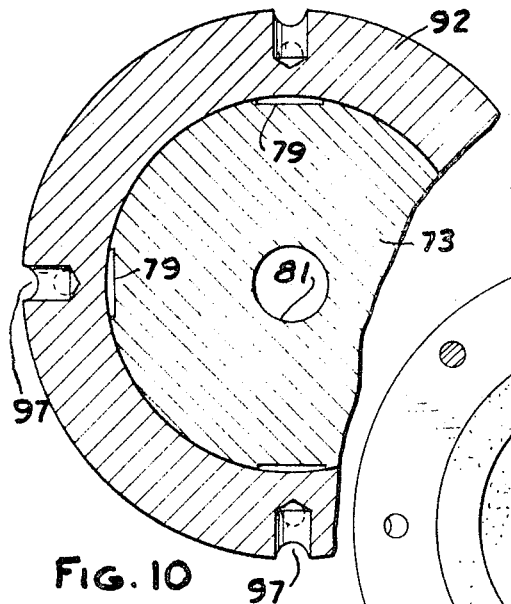
FIG. 10 is a fragmentary sectional view on an enlarged scale taken along the line 10—10 in FIG. 7.
Figure 12:
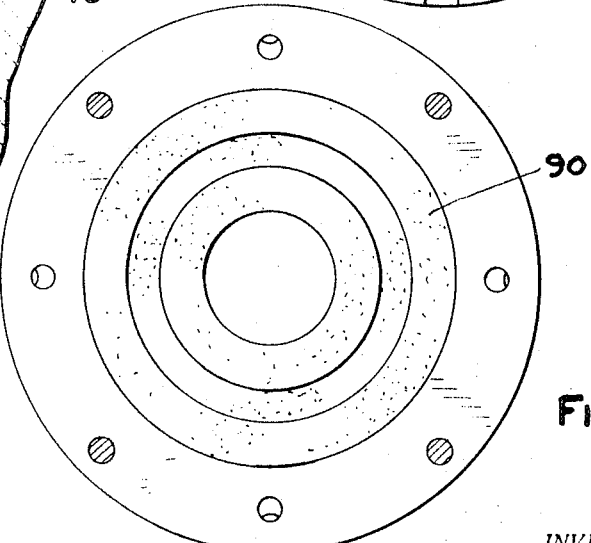
FIG. 12 is a sectional view taken along the line 12—12 in FIG. 7.

As shown in FIGS. 7 and 11, support 73 includes a radial face 87 that is formed with an annular groove 88 to which fluid is supplied from axial passage 81 through interconnecting passages 89. An annular porous member 90 (FIG. 7) is adhered to the surface 87 in overlying relation to the groove 88 so that the fluid flows through the porous member 90 against a flange 91 on a rotor 92. A similar porous member 90 and annular groove 88 is provided at the radial surface on the other end of support 73 (FIG. 12). The rotor 92 also includes a cylindrical surface 93 complementary to the surface 78 of the support 73. Support 73 also includes an annular vent groove or relief portion 94 which divides the surface 78 into two longitudinally spaced portions.

When fluid under pressure is supplied to axial opening 81, it flows through the radial passages 80 and each of the restrictors R through the pressure pads 79 and thereafter outwardly between the surfaces 78, 93 to hold the rotor 92 in stable, frictionless relation radially of the support 73. The fluid also flows through interconnecting passages 89 and the porous member 90 and thereafter in a film between the porous members 90 and the flanges 91 on the ends of the rotor 92 to maintain the rotor in stable relation axially of the support 73.

In order to facilitate the mounting of the model on the outer surface of the rotor 92, longitudinally spaced resilient O-rings 95 are provided in annular grooves 96 in the rotor. All vents connect to the external grooves 97 and to atmosphere between the model and the outer surface of the rotor 92.

Figure 13:
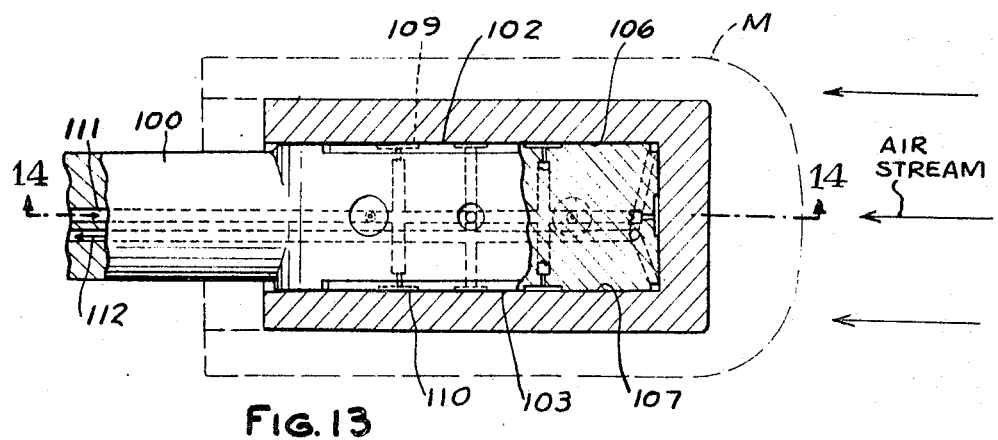
FIG. 13 is a fragmentary longitudinal sectional view of a further modified form of wind tunnel support.
Figure 14:
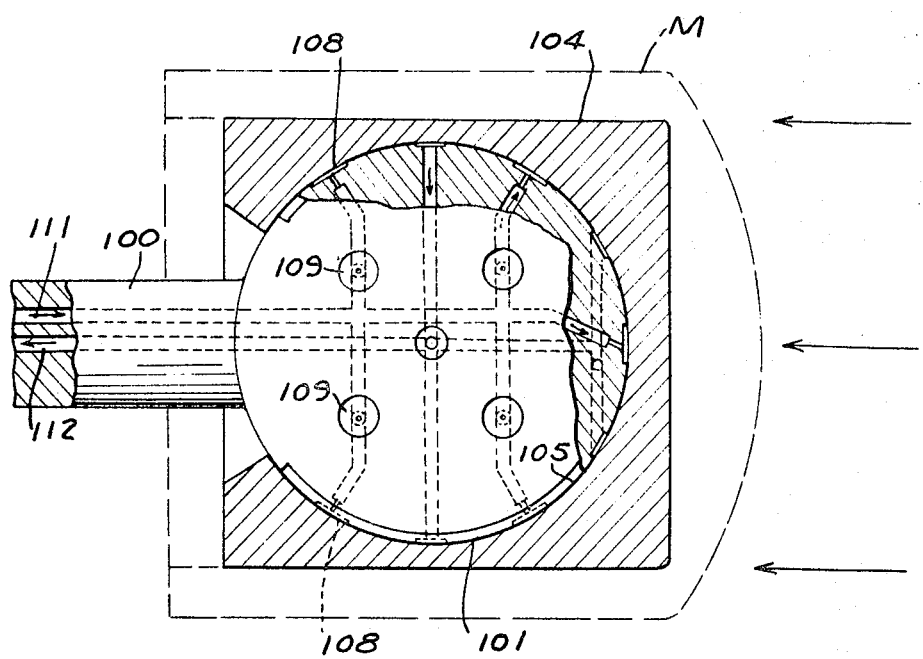
FIG. 14 is a fragmentary sectional view taken along the line 14—14 in FIG. 13.

In the form of the invention shown in FIGS. 13 and 14, the support 100 has a cylindrical side surface 101 and flat top and bottom surfaces 102, 103. The rotor 104 is formed with complementary surfaces 105, 106, 107. Pressure pads 108 and associated restrictors R are provided in the surface 102, 103. Fluid is supplied to the pressure pads through passage 111 and vented through collecting passage 112. In this form of the invention the model support provides free movement for limited arcuate extent horizontally.

We claim:
1. The combination comprising
 a wind tunnel,
 a support in said wind tunnel,
 a rotor having means thereon for supporting a wind tunnel model,
 said support and said rotor having complementary juxtaposed surfaces,
 said surfaces of said support having circumferentially spaced pressure pads thereon,
 a restrictor associated with each said pressure pad,
 and passage means in said support providing communication to each said pressure pad through which fluid under pressure may be supplied to each said pressure pad such that when fluid under pressure is being supplied fluid flows out of said pressure pads between said surfaces and said rotor is maintained in stable spaced relation to said support with the complementary surfaces out of contact, said complementary surfaces comprising a cylindrical surface extending axially of said wind tunnel and a radial surface extending transversely of said wind tunnel, said pressure pads being provided in longitudinally spaced groups on said cylindrical surface, said passage means comprising a longitudinally extending opening in said support one end of which communicates with a pressure pad in said radial surface, and interconnecting passages between said longitudinally extending opening and the pressure pads in said cylindrical surface.

2. The combination comprising
a wind tunnel,
a support in said wind tunnel,
a rotor having means thereon for supporting a wind tunnel model,
said support and said rotor having complementary juxtaposed surfaces,
said surfaces of said support having circumferentially spaced pressure pads thereon,
a restrictor associated with each said pressure pad,
and passage means in said support providing communication to each said pressure pad through which fluid under pressure may be supplied to each said pressure pad such that when fluid under pressure is being supplied fluid flows out of said pressure pads between said surfaces and said rotor is maintained in stable spaced relation to said support with the complementary surfaces out of contact,
said complementary surfaces comprising a spherical surface on said support and a complementary spherical surface on said rotor,
said pressure pads being provided in a circumferentially spaced row on said spherical surface on said support and at least one pressure pad is provided at about 90° to said pads in said row.

3. The combination set forth in claim 2 wherein said supports have an annular groove spaced from and surrounding said last mentioned pressure pad,
said rotor having a venting passage communicating with said annular groove and extending to the exterior of said rotor.

4. The combination comprising
a wind tunnel,
a support in said wind tunnel,
a rotor having means thereon for supporting a wind tunnel model,
said support and said rotor having complementary juxtaposed surfaces,
said surfaces of said support having circumferentially spaced pressure pads thereon,
a restrictor associated with each said pressure pad,
and passage means in said support providing communication to each said pressure pad through which fluid under pressure may be supplied to each said pressure pad such that when fluid under pressure is being supplied fluid flows out of said pressure pads between said surfaces and said rotor is maintained in stable spaced relation to said support with the complementary surfaces out of contact,
said complementary surfaces comprise a frusto-conical surface on said support and a complementary frusto-conical surface on said rotor,
said surfaces having their axes extending longitudinally of the wind tunnel,
said pressure pads being provided in said support in longitudinally spaced rows.

5. The combination set forth in claim 4 wherein said support has an annular groove between said rows,
said rotor having a venting passage therein communicating with said annular groove and extending to the exterior of said rotor.

6. The combination comprising
a wind tunnel,
a support in said wind tunnel,
a rotor having means thereon for supporting a wind tunnel model,
said support and said rotor having complementary juxtaposed surfaces,
said surfaces of said support having circumferentially spaced pressure pads thereon,
a restrictor associated with each said pressure pad,
and passage means in said support providing communication to each said pressure pad through which fluid under pressure may be supplied to each said pressure pad such that when fluid under pressure is being supplied fluid flows out of said pressure pads between said surfaces and said rotor is maintained in stable spaced relation to said support with the complementary surfaces out of contact,
said support includes longitudinally spaced cylindrical surfaces in which said pressure pads are provided in circumferentially spaced rows,
said cylindrical surfaces extending longitudinally of said wind tunnel,
said support including end surfaces having an annular porous member mounted thereon,
passages extending to said porous members for supplying fluid under pressure thereto,
said rotor having a surface complementary to a surface of said porous member at each end of said support.

7. The combination set forth in claim 6 wherein said support includes an annular groove in the end surface thereof to which fluid under pressure is supplied, said groove facing said porous member.

8. The combination comprising
a wind tunnel,
a support in said wind tunnel,
a rotor having means thereon for supporting a wind tunnel model,
said support and said rotor having complementary juxtaposed surfaces,
said surfaces of said support having circumferentially spaced pressure pads thereon,
a restrictor associated with each said pressure pad,
and passage means in said support providing communication to each said pressure pad through which fluid under pressure may be supplied to each said pressure pad such that when fluid under pressure is being supplied fluid flows out of said pressure pads between said surfaces and said rotor is maintained in stable spaced relation to said support with the complementary surfaces out of contact,
each said restrictor is provided with a filter interposed between said restrictor and said pressure pad.

9. The combination set forth in claim 8 wherein said filter comprises a microporous filter medium.

10. In a wind tunnel model support, the combination comprising
a support,
a rotor having means thereon for supporting a wind tunnel model,
said support and said rotor having complementary juxtaposed surfaces,
said surfaces of said support having circumferentially spaced pressure pads thereon,
a restrictor associated with each said pressure pad,
and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact, said complementary surfaces comprising a cylindrical surface adapted to extend longitudinally of said wind tunnel and a radial surface, one of said pressure pads being provided in said radical surface of said support, said pressure pads being provided in longitudinally spaced groups on said cylindrical surface of said support, said passage means comprising a longitudinally extending opening in said support one end of which communicates with said pressure pad in said radial surface, and interconnecting passages in said support between said longitudinally extending opening and the pressure pads in said cylindrical surface.

11. In a wind tunnel model support, the combination comprising a support, a rotor having means thereon for supporting a wind tunnel model, said support and said rotor having complementary juxtaposed surfaces, said surfaces of said support having circumferentially spaced pressure pads thereon, a restrictor associated with each said pressure pad, and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact, said complementary surfaces comprising a spherical surface on said support and a complementary spherical surface on said rotor, said pressure pads being provided in a circumferentially spaced row on said spherical surface on said support and at least one pressure pad is provided at about 90° to said pads in said row.

12. The combination set forth in claim 11 wherein said support has an annular groove spaced from and surrounding said last mentioned pressure pad, said rotor having a venting passage communicating with said annular groove and extending to the exterior of said rotor.

13. In a wind tunnel model support, the combination comprising a support, a rotor having means thereon for supporting a wind tunnel model, said support and said rotor having complementary juxtaposed surfaces, said surfaces of said support having circumferentially spaced pressure pads thereon, a restrictor associated with each said pressure pad, and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact, said complementary surfaces comprising a frusto-conical surface on said support and a complementary frusto-conical surface on said rotor, said pressure pads being provided in said support in longitudinally spaced rows.

14. The combination set forth in claim 13 wherein said support has an annular groove between said rows, said rotor having a venting passage therein communicating with said annular groove and extending to the exterior of said rotor.

15. In a wind tunnel model support, the combination comprising a support, a rotor having means thereon for supporting a wind tunnel model, said support and said rotor having complementary juxtaposed surfaces, said surfaces of said support having circumferentially spaced pressure pads thereon, a restrictor associated with each said pressure pad, and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact, said support including longitudinally spaced cylindrical surfaces in which said pressure pads are provided in circumferentially spaced rows, said support including annular end surfaces having an annular porous member mounted thereon, passages extending to said porous members for supplying fluid under pressure thereto, said rotor having a surface complementary to a surface of said porous member at each end of said support.

16. The combination set forth in claim 15 wherein said support includes an annular groove in the end surface thereof to which fluid under pressure is supplied, said groove facing said porous member.

17. In a wind tunnel model support, the combination comprising a support, a rotor having means thereon for supporting a wind tunnel model, said support and said rotor having complementary juxtaposed surfaces, said surfaces of said support having circumferentially spaced pressure pads thereon, a restrictor associated with each said pressure pad, and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact, each said restrictor being provided with a filter interposed between said restrictor and said pressure pad.

18. In a wind tunnel model support, the combination comprising a support, a rotor having means thereon for supporting a wind tunnel model, said support and said rotor having complementary juxtaposed surfaces, said surfaces of said support having circumferentially spaced pressure pads thereon, a restrictor associated with each said pressure pad, and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact, each said restrictor being provided with a filter interposed between said restrictor and said pressure pad, said filter comprising a microporous filter medium.

19. In a wind tunnel model support, the combination comprising
a support,
a rotor having means thereon for supporting a wind tunnel model,
said support and said rotor having complementary juxtaposed surfaces,
said surfaces of said support having circumferentially spaced pressure pads thereon,
a restrictor associated with each said pressure pad,
and passage means in said support providing communication to each said pressure pad through which fluid under pressure may be supplied to each said pressure pad such that when fluid under pressure is being supplied out of said pressure pads fluid flows between said surfaces and said rotor is maintained in stable spaced relation to said support with the complementary surfaces out of contact,
said complementary juxtaposed surfaces comprising complementary cylindrical surfaces and opposed pairs of complementary planar surfaces.

References Cited
UNITED STATES PATENTS

| | | | |
|---|---|---|---|
| 3,034,348 | 5/1962 | Holderer | 73—147 |
| 3,218,850 | 11/1965 | Rogallo | 73—147 |

LOUIS R. PRINCE, Primary Examiner

JEFFREY NOLTON, Assistant Examiner

U.S. Cl. X.R.

308—9